(12) United States Patent
Song

(10) Patent No.: US 10,931,195 B2
(45) Date of Patent: *Feb. 23, 2021

(54) SYSTEMS, APPARATUS AND METHODS OF ZERO CURRENT DETECTION AND START-UP FOR DIRECT CURRENT (DC) TO DC CONVERTER CIRCUITS

(71) Applicant: Lumileds LLC, San Jose, CA (US)

(72) Inventor: Zhihua Song, Palo Alto, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,016

(22) Filed: Jan. 29, 2020

(65) Prior Publication Data

US 2020/0212799 A1 Jul. 2, 2020

Related U.S. Application Data

(63) Continuation of application No. 16/235,596, filed on Dec. 28, 2018, now Pat. No. 10,301,317.

(51) Int. Cl.
*H02M 3/156* (2006.01)
*H02M 1/08* (2006.01)
*F21V 23/00* (2015.01)
*H02M 1/36* (2007.01)
*H05B 45/37* (2020.01)
*F21Y 105/10* (2016.01)
*F21Y 115/10* (2016.01)

(52) U.S. Cl.
CPC ........... *H02M 3/156* (2013.01); *F21V 23/005* (2013.01); *H02M 1/083* (2013.01); *H02M 1/36* (2013.01); *H05B 45/37* (2020.01); *F21Y 2105/10* (2016.08); *F21Y 2115/10* (2016.08)

(58) Field of Classification Search
CPC ........ H02M 3/156; H02M 1/36; H02M 1/083; F21V 23/005; H05B 45/37; F21Y 2115/10; F21Y 2105/10
See application file for complete search history.

(56) References Cited

U.S. PATENT DOCUMENTS

| 6,118,276 A | 9/2000 | Nakata et al. | |
|---|---|---|---|
| 2010/0194369 A1* | 8/2010 | Nagai | H02M 3/156 323/284 |
| 2012/0217900 A1* | 8/2012 | Kanamori | H05B 45/37 315/297 |

(Continued)

FOREIGN PATENT DOCUMENTS

EP 2696490 2/2014

*Primary Examiner* — Raymond R Chai
(74) *Attorney, Agent, or Firm* — Volpe Koenig

(57) ABSTRACT

A device includes a switch, a controller electrically coupled to the switch, an RC circuit, a diode and a zero current detection circuit. The controller is configured to provide a control signal to control the switch to charge and discharge an inductor between a zero current state and a peak current state to provide a light emitting diode (LED) drive current. The RC circuit includes at least a first resistive element, a second resistive element, and a capacitive element. The diode is electrically coupled in parallel with the RC circuit. The zero current detection circuit has a first input electrically coupled to the RC circuit, a second input electrically coupled to a threshold voltage, and an output electrically coupled to the controller.

22 Claims, 16 Drawing Sheets

(56) References Cited

U.S. PATENT DOCUMENTS

| | | | |
|---|---|---|---|
| 2013/0099694 A1* | 4/2013 | Naruo | H05B 45/3725 |
| | | | 315/224 |
| 2013/0293135 A1 | 11/2013 | Hu et al. | |
| 2014/0085947 A1* | 3/2014 | Capilla | H02M 1/4225 |
| | | | 363/52 |
| 2015/0023067 A1* | 1/2015 | Terasawa | H02M 1/4225 |
| | | | 363/21.12 |
| 2015/0381043 A1* | 12/2015 | Nguyen | H02M 3/158 |
| | | | 323/235 |
| 2017/0236472 A1 | 8/2017 | Yonemaru et al. | |
| 2018/0054113 A1* | 2/2018 | Kim | H02M 1/15 |
| 2018/0278151 A1* | 9/2018 | Gritti | H02M 1/4225 |
| 2019/0006935 A1* | 1/2019 | Wang | H02M 3/33523 |
| 2019/0098712 A1* | 3/2019 | Chen | H05B 45/37 |
| 2019/0115841 A1* | 4/2019 | Maruyama | H02M 3/156 |
| 2019/0319539 A1* | 10/2019 | Jiang | H02M 1/34 |

\* cited by examiner

SYSTEMS, APPARATUS AND METHODS OF ZERO CURRENT DETECTION AND START-UP FOR DIRECT CURRENT (DC) TO DC CONVERTER CIRCUITS

CROSS REFERENCE TO RELATED APPLICATION(S)

This application is a continuation of U.S. patent application Ser. No. 16/235,596, filed Dec. 28, 2018, which is incorporated by reference as if fully set forth.

BACKGROUND

Direct current (DC) to DC (DC-DC) converter circuits may be used in light emitting device (LED) lighting systems to step down or up a voltage and provide a current to drive one or more LED devices or arrays. DC-DC converter circuits, such as buck converter circuits, boost converter circuits, and buck-boost converter circuits, may be operable in different modes by controlling an ON state and an OFF state of a switch coupled to the main inductor. Such modes may include, for example, a continuous current mode (CCM) in which the current through the main inductor never drops below zero during switching, a discontinuous current mode (DCM) during which current through the main inductor periodically drops to zero for a period of time before it begins flowing again, and a critical or boundary mode (CRM) in which the current through the main inductor periodically drops to zero and then instantly begins flowing again.

SUMMARY

Systems, apparatus and methods for zero current detection and start-up for DC-DC converter circuits are described herein. A device includes a first circuit and a second circuit. The first circuit receives a first voltage, at a first input, and provides a second voltage having one of a first level and a second level based on a level of the first voltage being above or below a threshold voltage. The second circuit is electrically coupled to the first input of the first circuit and decreases the level of the first voltage below a threshold voltage on a condition that the level of the first voltage is above the threshold voltage for a maximum time.

DETAILED DESCRIPTION OF THE PREFERRED EMBODIMENTS

Figure 1A:
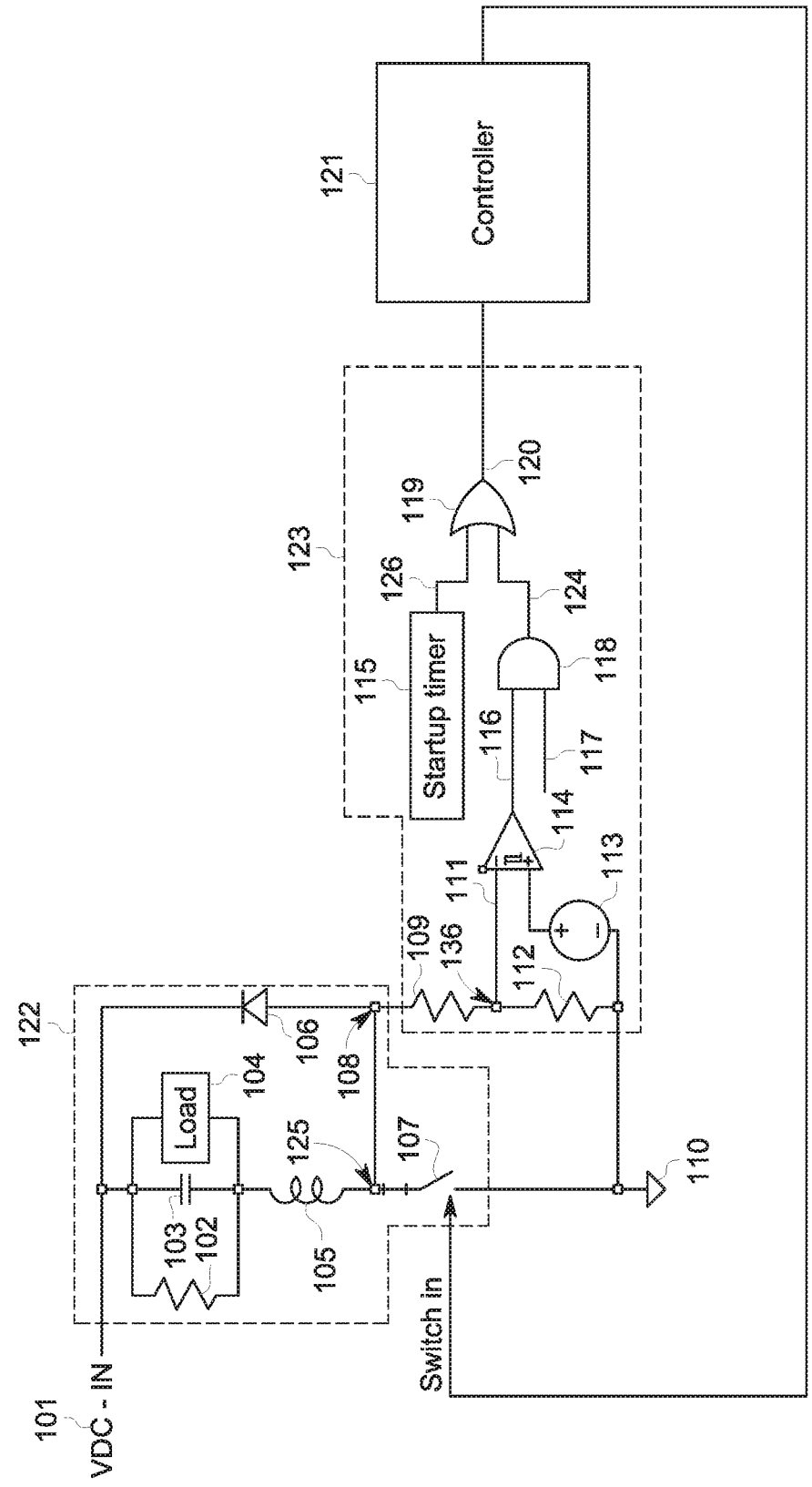
FIG. 1A is a circuit diagram of an example DC-DC converter circuit configured to operate in a critical mode (CRM)

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper," "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Further, whether the LEDs, LED arrays, electrical components and/or electronic components are housed on one, two or more electronics boards may also depend on design constraints and/or application.

Semiconductor light emitting device (LED) devices or optical power emitting devices, such as devices that emit ultraviolet (UV) or infrared (IR) optical power, are among the most efficient light sources currently available. These devices may include light emitting diodes, resonant cavity light emitting diodes, vertical cavity laser diodes, edge emitting lasers, or the like. Due to their compact size and lower power requirements, for example, LEDs may be attractive candidates for many different applications. For example, they may be used as light sources (e.g., flash lights and camera flashes) for hand-held battery-powered devices, such as cameras and cell phones. They may also be used, for example, for automotive lighting, heads up display (HUD) lighting, horticultural lighting, street lighting, torch for video, general illumination (e.g., home, shop, office and studio lighting, theater/stage lighting and architectural lighting), augmented reality (AR) lighting, virtual reality (VR) lighting, as back lights for displays, and IR spectroscopy. A single LED may provide light that is less bright than an incandescent light source, and, therefore, multi-junction devices or arrays of LEDs (such as monolithic LED arrays, micro LED arrays, etc.) may be used for applications where more brightness is desired or required.

As mentioned above, DC-DC converter circuits may be used in LED lighting systems to step down or up a voltage and provide a current to drive one or more LED devices or arrays, and DC-DC converter circuits may be operable in a number of different modes. The critical mode is often used because it is relatively easy to control.

FIG. 1A is a circuit diagram of an example DC-DC converter circuit 100 that is configured to operate in CRM. In the illustrated example, the DC-DC converter circuit 100 includes a zero current detection (ZCD) circuit 123 and a power stage circuit 122 that is configured to step down the DC voltage and apply a current to the load 104.

The power stage circuit 122 may include a DC voltage input VDC-IN 101 and a resistor 102, a capacitor 103, a load 104, an inductor 105, and a diode 106 electrically coupled in parallel. A switch 107 may be electrically coupled in parallel with the ZCD circuit 123. A terminal of the switch is represented as 125 in FIG. 1A.

The ZCD circuit 123 may include resistors 109 and 112, which may be electrically coupled in series, and a comparator 114. A first input 111 to the comparator may be electrically coupled at a ZCD node 136 between the resistors 109 and 112, and a second input to the comparator may be electrically coupled to receive a reference voltage 113. An output of the comparator 114 may be electrically coupled to a first input 116 of an AND gate 118. A second input 117 of the AND gate 118 may be electrically coupled to receive an OFF-state signal. Methods of generating the OFF-state signal are known in the art and are, therefore, not discussed in detail herein. An output 124 of the AND gate 118 may be electrically coupled to a first input 124 of an OR gate 119. A second input 126 of the OR gate 119 may be electrically coupled to a startup timer 115. An output 120 of the OR gate 119 may be coupled to a controller 121, which may be an integrated circuit (IC) controller or a discrete controller, such as a microcontroller provided on an electronics board and/or in an LED lighting system either on the same electronics board as, or a different electronics board than, the DC-DC converter circuit. Example electronics boards and LED lighting systems in which the DC-DC converter circuits described herein may be implemented are described below with respect to FIGS. 2, 3A, 3B, 3C, 3D, 3E and 4. A node 108 may be coupled between the inductor 105 and the diode 106.

In operation, the DC voltage VDC-IN 101 may be supplied to the power stage circuit 122 via the DC voltage input, and the ZCD circuit 123 along with the switch 107 and the controller 121 may operate the power stage circuit 122 in CRM.

On a condition that the switch 107 is switched to an ON state, a current begins to flow through the capacitor 103 in parallel with the load 104, the inductor 105 and the switch 107, and the current flowing through the inductor 105 (also referred to herein as inductor current) increases over a time during which the switch is in the ON state. On a condition that the switch 107 is switched to an OFF state, the DC-DC converter circuit 100 transitions to a freewheeling period during which the inductor 105 releases the energy accumulated while the switch 107 was in the ON state by pushing the current through another path that includes the diode 106 and the capacitor 103 in parallel with the load 104. The inductor current gradually decreases over a time during which the switch is in the OFF state until reaching zero.

In order for the ZCD circuit 123, in conjunction with the controller 121, to control the power stage circuit 122 to operate in CRM, the ZCD circuit 123 may detect when the inductor current drops to zero or near zero and provide a voltage to the controller 121 that may trigger the controller 121 to provide a high turn-on signal, switching the switch 107 to the ON state. Directly detecting the inductor current, however, is not straightforward, and, therefore, such detection is often done indirectly. One method of indirectly detecting ZCD is to detect a resonance between the inductor 105 and parasitic capacitances at the terminal 125 of the switch 107 (represented by node 108 in FIG. 1A) that begins when the inductor current drops to zero, indicating the end of the freewheeling period. The resonance at the node 108 may substantially decrease the voltage at the ZCD node 136 to a low value (i.e., a value that is significantly lower than a ZCD threshold voltage) under normal conditions. Consequently, the ZCD circuit 123 may detect ZCD on a condition that the voltage at the ZCD node 136 (also referred to herein as the ZCD node voltage) drops below the ZCD threshold voltage.

A simple resistor divider formed from the resistor 109 and the resistor 112 may be used to detect the ZCD node voltage across the resistor 112. When the voltage at the ZCD node 136 drops below the ZCD threshold voltage (which may be provided by the reference voltage 113), an output of the comparator 114 may be high.

The AND gate 118 may be used ensure that the ZCD state is only detected when the switch 107 is in the OFF state. On a condition that both the output of the comparator 114 and the OFF-state signal provided at the input 117 are high, the AND gate 118 may provide a high voltage at the output 124, which may indicate that ZCD is detected, and, consequently, that the switch 107 should be switched to the ON state.

The above-described operation of the DC-DC converter circuit 100 is for a DC-DC converter circuit operating in a normal switching mode during which the switch 107 is switched between the ON state and the OFF state in a specific pattern controlled by the controller 121. During non-switching states, however, such as a non-switching state during initial power on or a non-switching state when switching may pause after it starts up, the resonance at the node 108 may not exist. During certain special switching states, such as a switching state when the output voltage across the load 104 is low, the resonance at the node 108 may be weak and the oscillation amplitude of both the voltage at the node 108 and the inductor current may be lower than in the normal switching mode. Consequently, during both the non-switching and special switching states, the minimum voltage at the node 108 when the switch 107 is in the OFF state may be significantly higher than in the normal switching mode. Thus, the ZCD node voltage may remain above the ZCD threshold voltage, maintaining the switch 107 in the OFF state. Furthermore, in the special switching states, because all components in a practical DC-DC converter design may be non-ideal and contain parasitic and dissipative resistance, the weak resonance at the node 108 may be damped and attenuated such that it may eventually disappear.

In order to start, restart or continue switching in such abnormal switching states, a startup timer, such as the startup timer 115 illustrated in FIG. 1A, is conventionally used to trigger the controller 121 to switch the switch 107 to the ON state when the ZCD node voltage remains above the ZCD threshold voltage for a maximum time. The startup timer 115 may monitor the quiescent time during which the switch 107 is in the OFF state. On a condition that the time monitored using the startup timer 115 exceeds the maximum time, the startup timer 115 may provide a voltage at the input 126 of the OR gate 119 that may cause the OR gate to provide a voltage to the controller 121 that may trigger the controller 121 to switch the switch to the ON state. In other words, either ZCD detection at the ZCD node 136, or triggering by the startup timer 115, may switch the switch 107 to the ON state.

As may be readily seen from FIG. 1A, inclusion of the startup timer 115 in the ZCD circuit 123 requires additional logic in addition to the startup timer 115. This may increase both the complexity of the control circuitry and the cost of manufacturing the DC-DC converter, resulting in a larger printed circuit board (PCB) size for LED lighting systems in which the DC-DC converter is provided on a separate electronics board or a larger substrate area for an integrated LED lighting system.

Figure 1B:
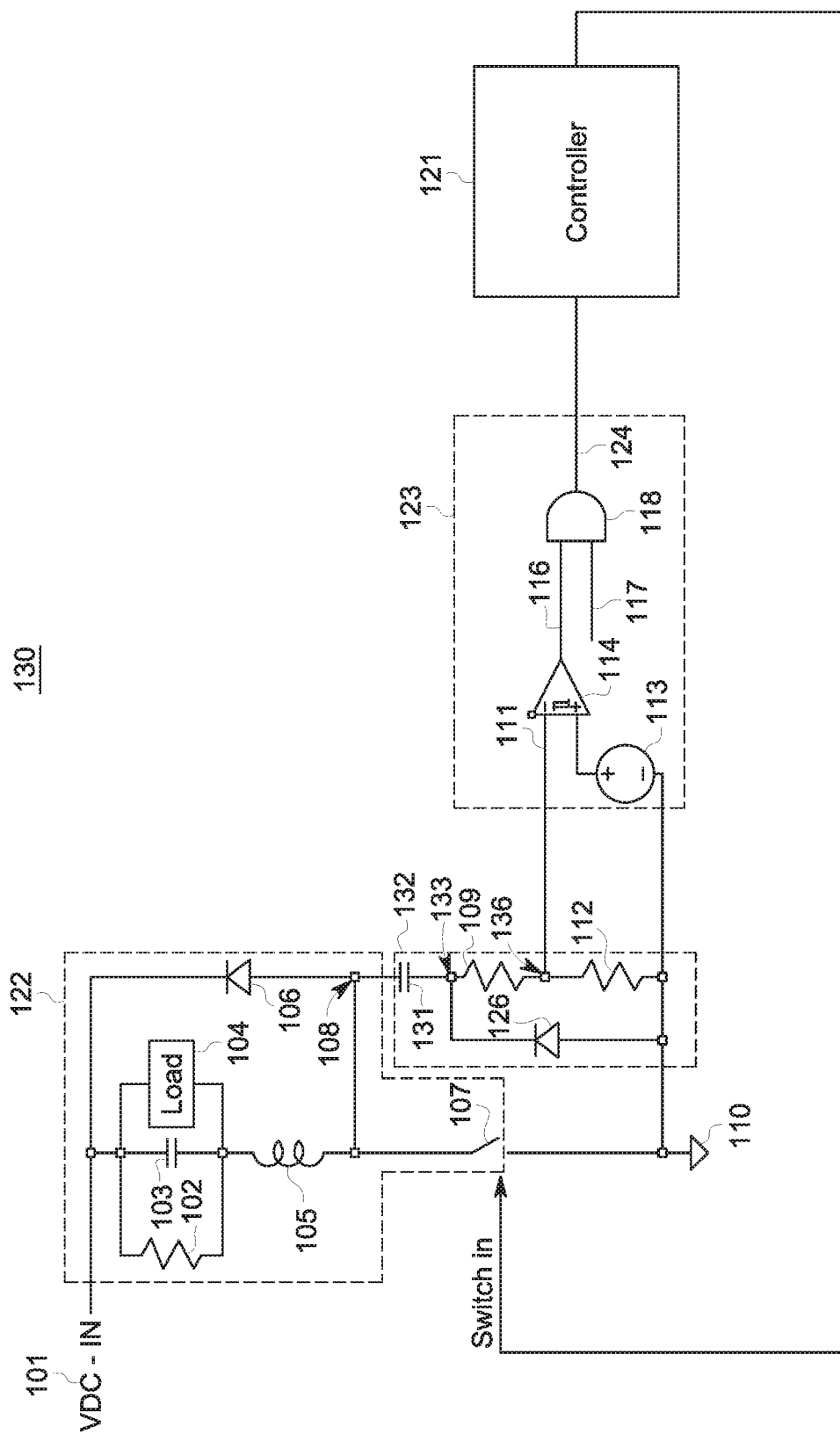
FIG. 1B is a circuit diagram of another example DC-DC converter circuit configured to operate in CRM.

FIG. 1B is a circuit diagram of another example DC-DC converter circuit 130 configured to operate in CRM. In the example illustrated in FIG. 1B, a multi-functional circuit 132 is provided between the power stage circuit 122 and the ZCD circuit 123. The multi-functional circuit 132 may perform both the startup timer functions and some of the ZCD functions. The illustrated multi-functional circuit 132 includes a capacitor 131 electrically coupled in series with the resistors 109 and 112 and a diode 126 electrically coupled in parallel with the resistors 109 and 112. Components in FIG. 1B that have the same numbers as components in FIG. 1A and may operate similarly unless otherwise specified.

In operation, on a condition that the switch 107 is in the OFF state, the voltage at the node 108 may be high and the capacitor 131 may be charged through the resistors 109 and 112. The speed of the charging may be determined by the resistor-capacitor (RC) time constant, which may be proportional to the capacitance of the capacitor 131 multiplied by the sum of resistances of resistors 109 and 112.

On a condition that the switch 107 is switched to the ON state, the voltage at the node 108 may be low, and the capacitor 131 may be discharged directly through the diode 126. The path directly through the diode 126 may be much faster than the charging such that the voltage at the capacitor 131 may quickly reset from the voltage stored during the time that the switch was in the OFF state to zero or near zero volts. Thus, every time the switch 107 is switched to the OFF state, the capacitor 131 may recharge from zero or near zero such that the voltage at the capacitor 131 reflects the continuous OFF time of the switch 107.

By selecting the RC time constant of the resistors 109 and 112 and the capacitor 131 to be substantially longer than a maximum time (e.g., the switching cycle time corresponding to a minimum switching frequency), during normal operation, the voltage at the capacitor 131 may be so much lower than the voltage at the node 108 that the capacitor 131 voltage may not affect the voltage at the ZCD node 136. However, in a non-switching state or special switching state, such as described above, the OFF time of the switch may be significantly extended, such that the capacitor 131 may charge to a sufficiently high voltage level to decrease the ZCD node voltage below the ZCD threshold voltage. As a result, the comparator 114 may provide a high output voltage, triggering the controller 121 to switch the switch 107 to the ON state, starting or restarting switching.

While the resistors 109 and 112 are illustrated in FIG. 1B as part of the multi-functional circuit 132, as with the embodiment illustrated in FIG. 1A, these resistors may also serve the function of enabling the ZCD circuit 123 to detect ZCD. However, the values of these resistors 109, 112 may also be used to set the maximum time. Since both the timing and ZCD detection may be performed via an input 111 to the ZCD circuit 123, a dedicated startup timer (e.g., startup timer 115 of FIG. 1A), the OR gate (e.g., OR gate 119 of FIG. 1A) and other related circuit elements, may be eliminated. In addition, circuits, such as described herein, may be operable at very high frequencies, which enable use of smaller inductors in the DC-DC converters. For integrated LED lighting systems, this may be particularly advantageous as it may reduce the height of the inductor, reducing or eliminating potential blockage of light emitted by the LED arrays provided on the same circuit board as the DC-DC converter circuit. Further, smaller inductors may also take up less overall space, further reducing form factor of integrated electronics boards.

Figure 1C:
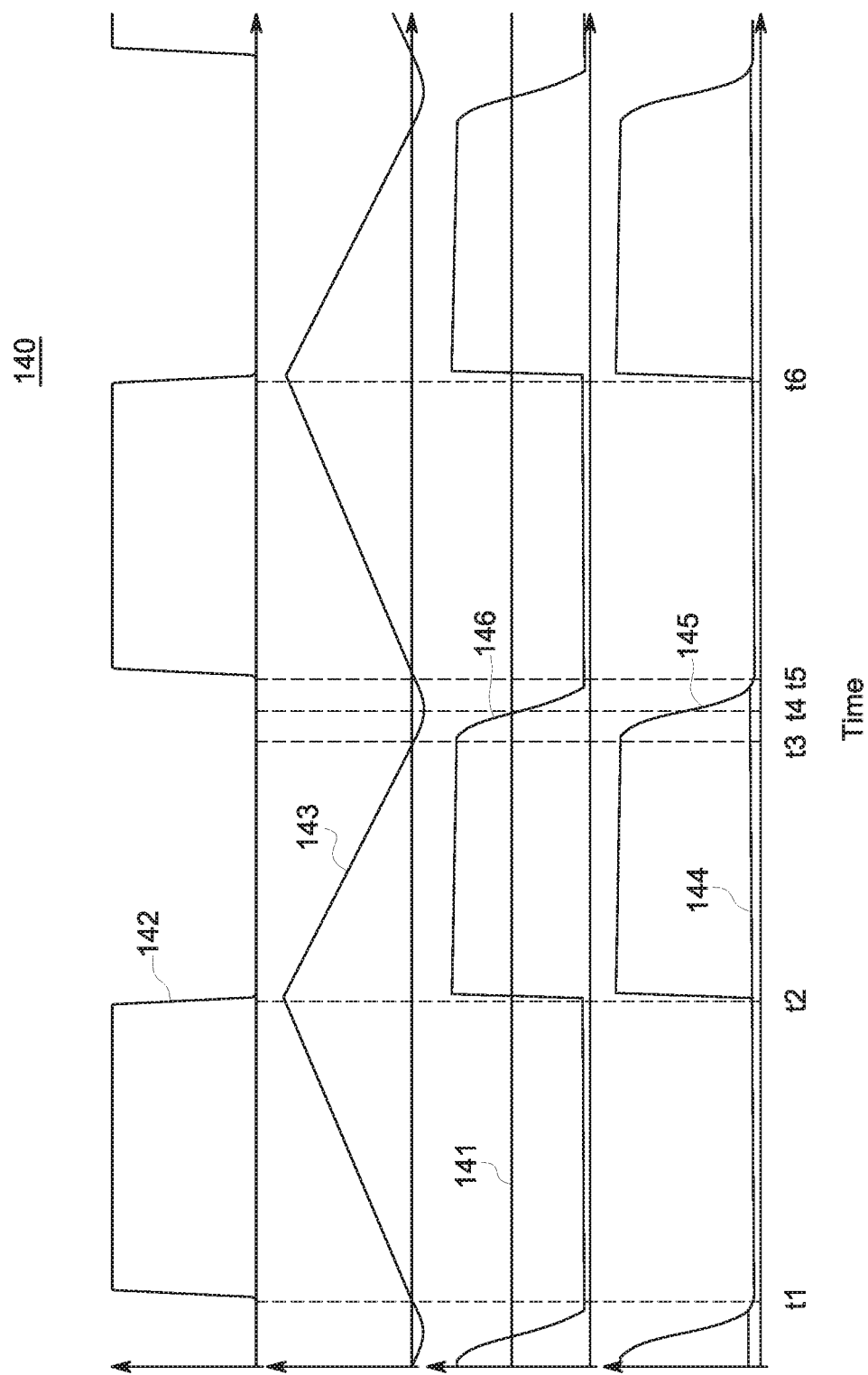
FIG. 1C is a graph showing the state of various components of the DC-DC converter circuit of FIG. 1B at certain time instants during a normal switching cycle.

FIG. 1C is a graph 140 showing the state of various components in the circuit of FIG. 1B at certain time instants during a normal switching cycle. At the time t1, the turn-on signal 142 may be high, the switch 107 may be switched to the ON state, and the inductor current 143 may gradually increase. Voltages at the node 108 (145), the ZCD node 136 (146) and the capacitor 131(144) may all be low.

At time t2, the turn-on signal 142 may turn low, and the switch 107 may be switched to the OFF state, signifying the beginning of the freewheeling period. The inductor current 143 may flow through the diode 106 and gradually decrease toward zero. The voltage 145 at the node 108 may be clamped to the input voltage VDC-in by the freewheeling current. The capacitor 131 may charge slightly through the resistors 109 and 112, but its voltage 144 may essentially remain low with barely noticeable changes. The voltage 146 at the ZCD node 136 may be basically flat and high (e.g., much higher than the ZCD threshold voltage 141). The voltage 146 at the ZCD node 136 may be given by Equation 1 below:

$$\text{ZCD\_node\_voltage} = (108\_\text{node\_voltage} - C131\_\text{voltage}) * R112/(R109 + R112) \quad \text{Equation (1)}.$$

At time t3, the inductor current 143 may reach zero, the freewheeling period may end, and the parasitic resonance may begin between the inductor 105 and parasitic capacitances at the node 108. As a result, the voltages at the node 108 (145) and the ZCD node 136 (146) may quickly collapse while the inductor current 143 becomes negative. The voltage at the capacitor 131(144) may remain low.

At time t4, the voltage at the ZCD node 136 (146) may be below the ZCD threshold voltage 141, and the turn-on signal 142 may be set to high. In some embodiments, a delay time may be added to hold the turn-on signal 142 voltage in a low state until the voltage at the node 108 (145) further decreases to its lowest point, or the valley. This technique, which is also referred to as valley switching, may minimize turn-on losses by switching the switch 107 to the ON state at valleys of the voltage 145 at the node 108.

At time t5, the voltage at both the node 108 (145) and the ZCD node 136 (146) may drop to their lowest values, the turn-on signal 142 may become high, and the switch 107 may be switched to the ON state at the valley of the voltage 145 at the node 108 due to the extra delay between t4 and t5. The capacitor 131 voltage 144 may discharge to zero or near zero through the diode 126 and the switch 107 with negligible increase in turn-on losses because the voltage built up between t2 and t5 may be very low. At this point, a new switching cycle may begin.

At time t6, the turn-on signal 142 for the new cycle may become low again.

Figure 1D:
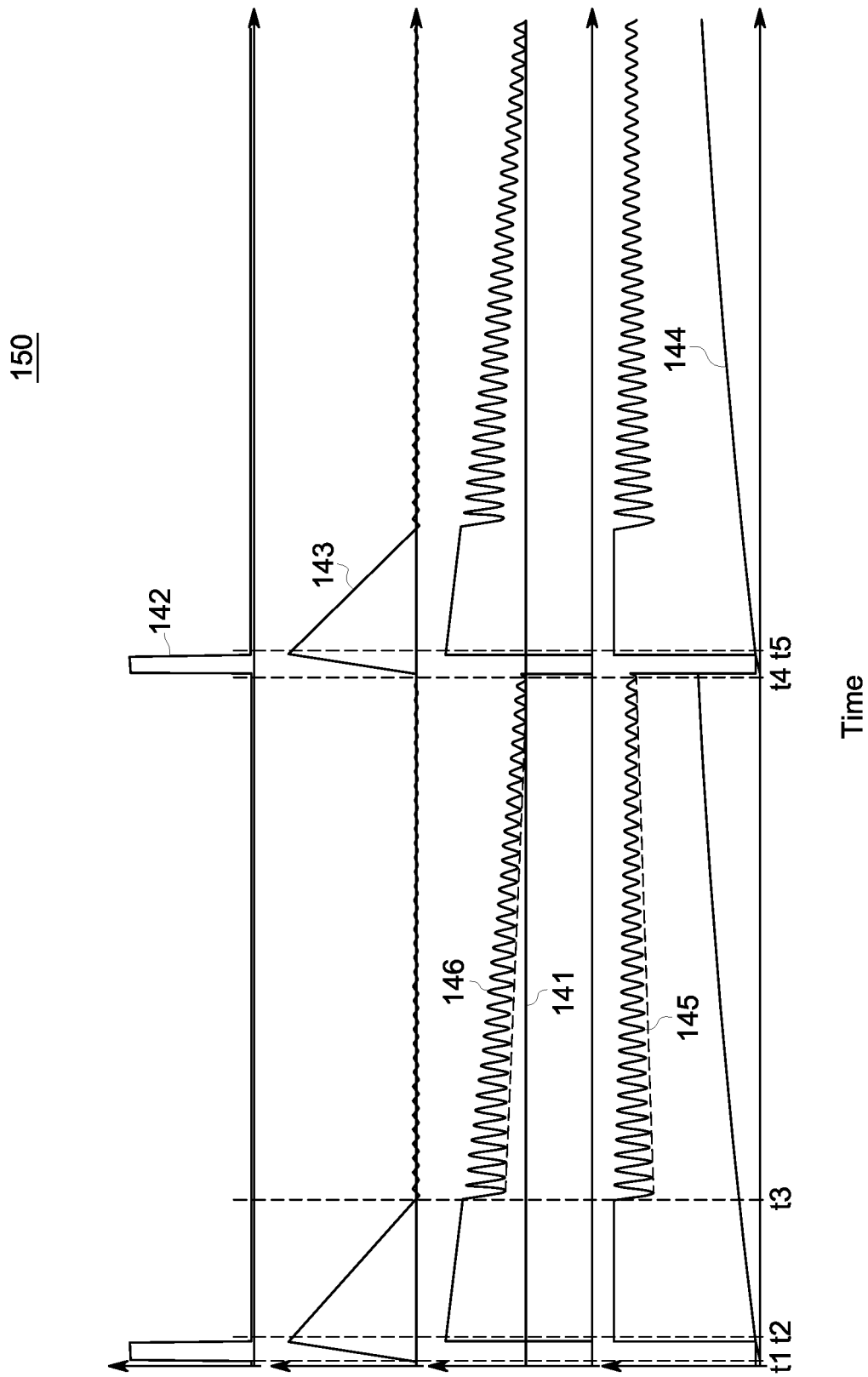
FIG. 1D is a graph showing the state of various components in the DC-DC converter circuit of FIG. 1B at certain time instants during an abnormal switching cycle.

FIG. 1D is a graph 150 showing the state of various components in the circuit of FIG. 1B at certain time instants during an abnormal switching cycle. It should be noted that FIG. 1D, as compared with FIG. 1C, uses a significantly larger time scale (i.e., the unit time duration in the graph of FIG. 1D is much longer than in FIG. 1C).

During an abnormal switching cycle, the output voltage across the load 104 may be temporarily very low, which may considerably prolong the freewheeling period. The very low output voltage may also substantially increase the minimum voltage at the node 108 at the valleys during the weak parasitic resonance after the freewheeling period ends. Without the timing functionality, the ZCD node voltage in this scenario may never drop below the threshold voltage during the OFF state of the switch 107 due to the weak resonance at the node 108, halting the normal switching cycle of the switch 107.

In the example illustrated in FIG. 1D, at time t1, the turn-on signal 142 is high, and the switch 107 is turned on. The inductor current 143 may begin increasing, and the voltages at the node 108 (145), the ZCD node 136 (146), and the capacitor 131 (144) may all be low.

At time t2, the turn-on signal 142 may be low, the switch 107 may be turned off, and the freewheeling period may begin. The inductor current 143 may flow through the diode 106 and gradually decrease towards zero. The voltage at the node 108 (145) may be clamped to the input voltage VDC-IN by the freewheeling current. The capacitor 131 may gradually charge through the resistors 109 and 112, and the voltage increase may be visible during the prolonged freewheeling period. The voltage at the ZCD node 136 (146), as represented in Equation (1) above, may gradually decrease with the increase of capacitor 131 voltage (144), but may remain above the ZCD threshold voltage 141.

At time t3, the inductor current 143 may reach zero or near zero, indicating the end of the freewheeling period. At this point, the parasitic resonance may begin between the inductor 105 and parasitic capacitances at the node 108. As a result, the voltages at the node 108 (145) and the ZCD node 136 (146) drop, while the inductor current 143 becomes negative. Due to the very low output voltage across the load 104, however, the resonance may be weak and the oscillation amplitude of both the node 108 voltage 145 and the inductor current 143 may be lower than in the normal switching cycle described above with respect to FIG. 1C. Consequently, the node 108 voltage 145 at valleys, as indicated by the dashed line in FIG. 1D, may be significantly higher than in the normal switching cycle. Thus, the ZCD-node voltage 146, as represented by Equation (1) above, may remain above the ZCD threshold voltage 141, maintaining the switch 107 in the OFF state, and the resonance at the node 108 may continue.

Because all components in a practical converter design may be non-ideal and contain parasitic and dissipative resistance, the resonance at the node 108 may be damped and attenuating (i.e., it may become weaker and weaker and may eventually disappear). The node 108 voltage (145) at valleys, as indicated by the dashed line in FIG. 1D, may continue increasing during the damped resonance. The ZCD-node voltage 146 at valleys (indicated by another dashed line in FIG. 1D), however, may continue decreasing toward the ZCD threshold voltage 141 because of the gradual charge of capacitor 131 voltage 144 through the resistors 109 and 112.

At time t4, despite the attenuating resonance, the ZCD-node voltage 146 may drop below the ZCD threshold voltage 141 due to the increased capacitor 131 voltage (144). The turn-on signal 142 may become high, and the switch 107 may be switched to the ON state to start a new cycle. The capacitor 131 voltage may quickly discharge to zero or near zero through the diode 126 and the switch 107.

The capacitor 131 voltage 144 discharged at the turn-on moment may also be much higher than in the normal switching cycle. Accordingly, the losses of the single turn-on event may significantly increase. On the other hand, the switching frequency may be lower due to the extended freewheeling period and parasitic resonance period. Therefore, the average turn-on losses, which are proportional to both the losses of single turn-on and the switching frequency, may not dramatically increase. In addition, for a properly designed circuit, the situations described in this scenario with a forced turn-on of the switch 107 without ZCD detection may be temporary and may not last such that the temperature increase resulting from the extra turn-on losses may be minimized.

At time t5, the turn-on signal for the new cycle may become low again.

The scenario illustrated in the graph of FIG. 1D is a specific example of one condition that may trigger the forced turn-on of the switch 107 in the absence of ZCD detection. Any operation of a DC-DC converter circuit with extended turn-off time of the switch 107 may trigger this. In order to ensure the forced turn-on only happens during such situations that do not interfere with normal operation, the capacitor 131, the resistor 109 and the resistor 112 may be dimensioned such that the start-up time (i.e., the time to charge the capacitor 131 in the turn-off period such that the ZCD-node voltage drops below the threshold) is more than the maximum turn-off time under normal operating conditions. On the other hand, the start-up time should be as short as possible for a fast start or re-start. In embodiments, a start-up period several times larger than the maximum cycle time may be used.

The example DC-DC converter circuit 130 illustrated in FIG. 1B is an example of a buck converter. However, the embodiments described herein may be applicable to any type of DC-DC converter circuit. Specific examples are illustrated in FIGS. 1E, 1F and 1G.

Figure 1E:
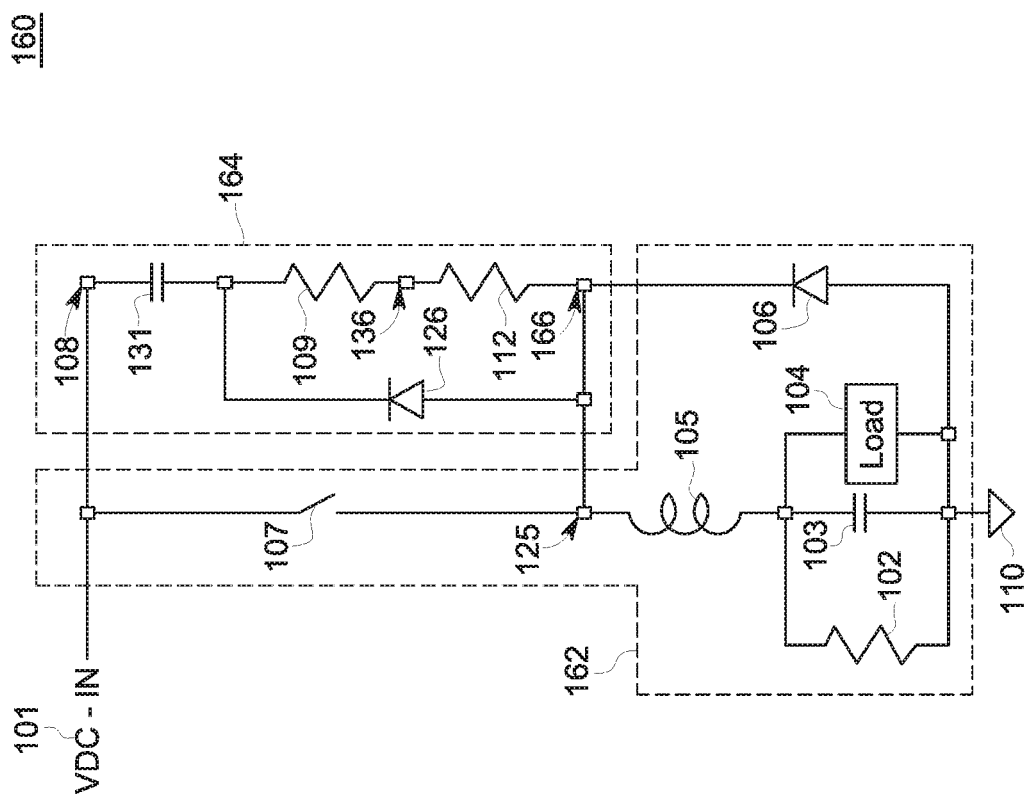
FIG. 1E is a circuit diagram of an example buck converter with the load referenced to ground and the ZCD signal referenced to floating ground.

FIG. 1E is a circuit diagram of an example buck converter circuit 160 with the load 104 referenced to ground 110 and the ZCD signal referenced to floating ground 166. The floating ground 166 may switch to the VDC-IN voltage 101 when the switch 107 is switched to the ON state and to ground when the switch 107 is in the OFF state and the diode 106 is turned on. The illustrated buck converter circuit 160 includes a power stage circuit 162 and a multi-functional circuit 164 arranged as shown.

Figure 1F:
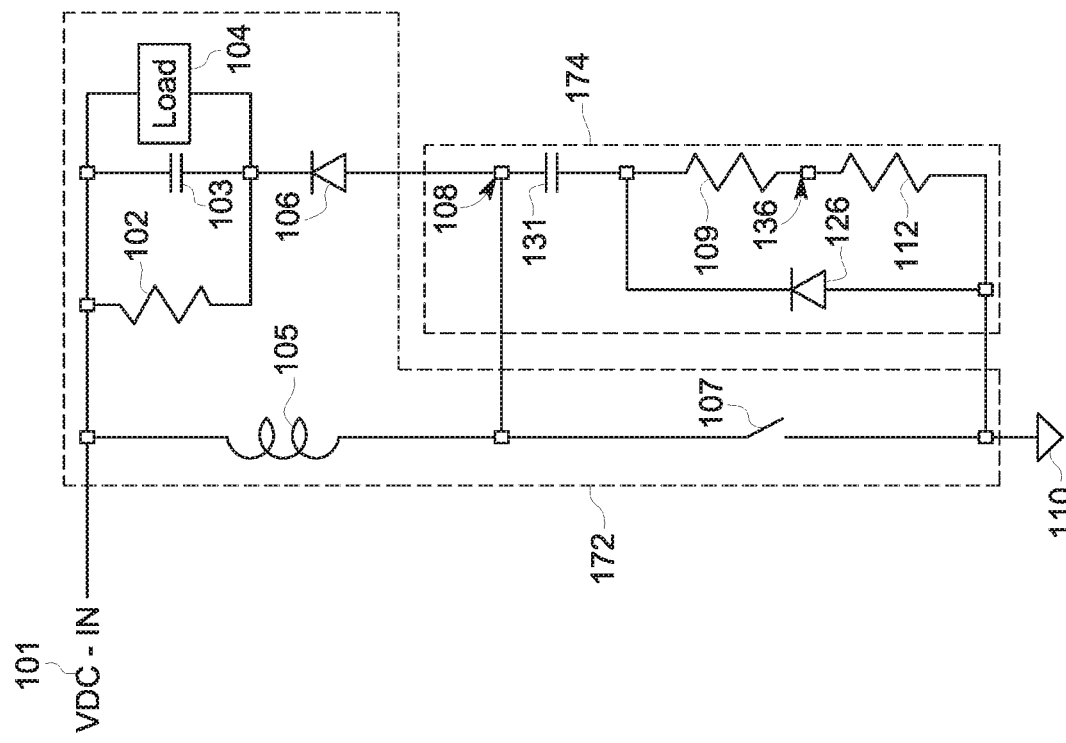
FIG. 1F is a circuit diagram of an example buck-boost converter with the switch referenced to ground.

FIG. 1F is a circuit diagram of an example buck-boost converter circuit 170 with the switch 107 referenced to ground 110. The illustrated buck-boost converter circuit 170 includes a power stage circuit 172 and a multi-functional circuit 174 arranged as shown.

Figure 1G:
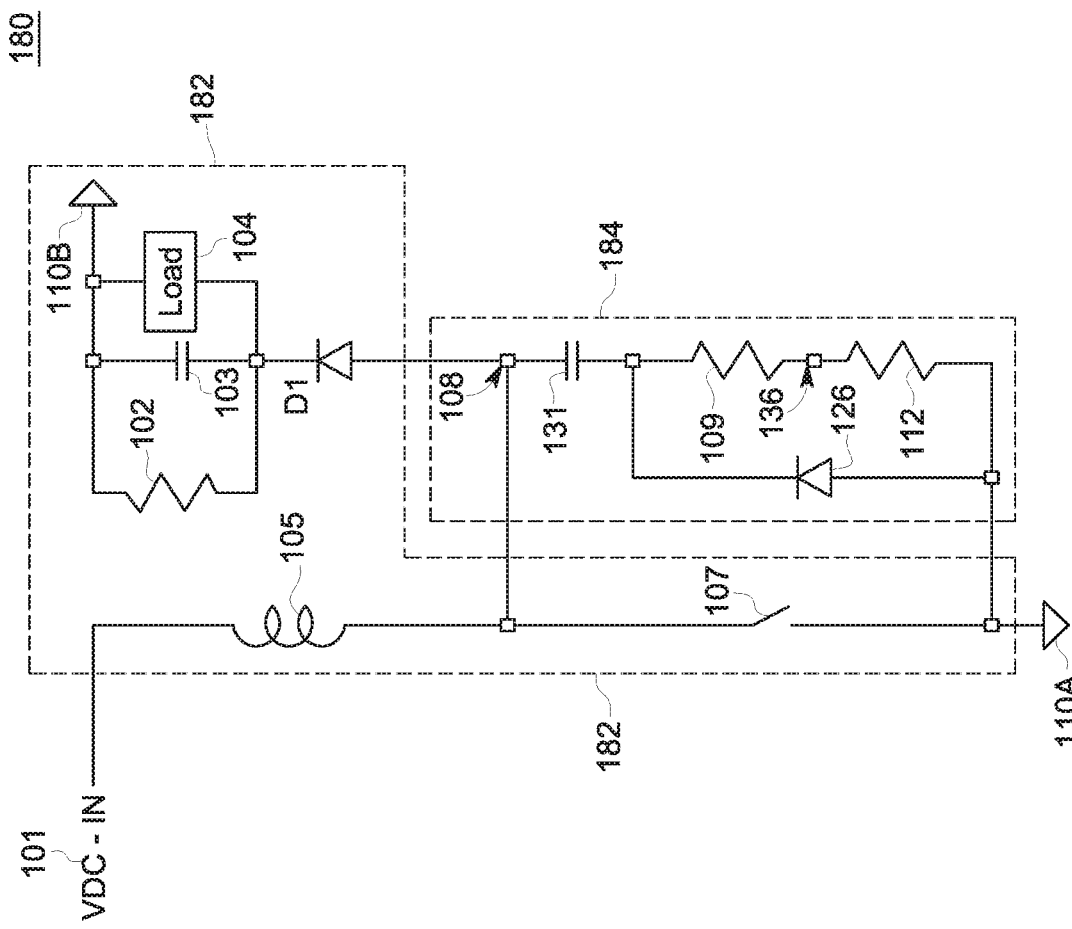
FIG. 1G is a circuit diagram of an example boost converter with the switch referenced to ground.

FIG. 1G is a circuit diagram of an example boost converter circuit 180 with the switch 107 referenced to ground 110A. The illustrated boost converter circuit 180 includes a power stage circuit 182 and a multi-functional circuit 184 arranged as shown.

Figure 1H:
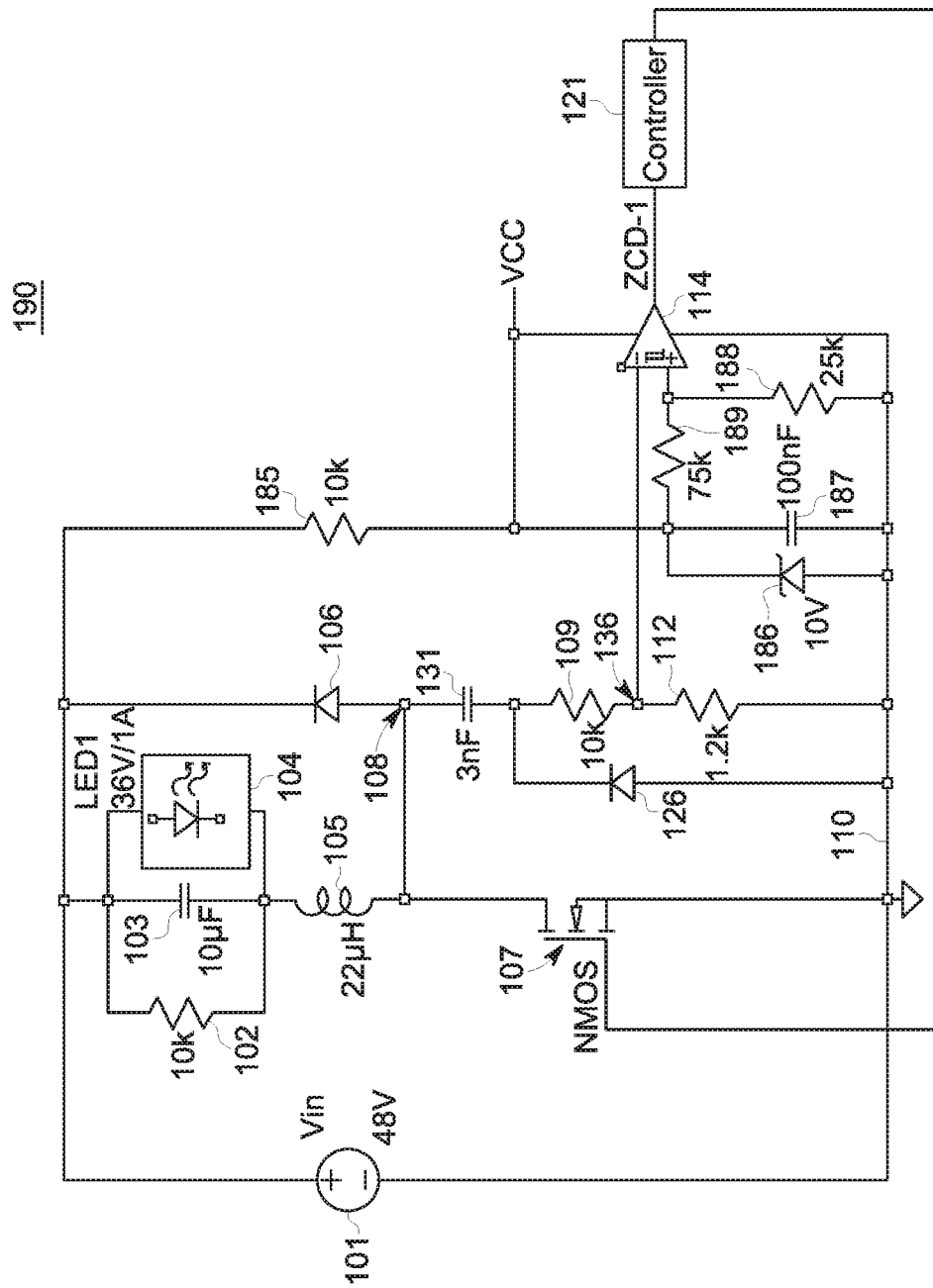
FIG. 1H is a circuit diagram showing a detailed example implementation of the DC-DC converter circuit of FIG. 1B.

FIG. 1H is a circuit diagram showing a detailed example implementation of the power stage multi-functional, and ZCD circuitry of FIG. 1B in a buck converter circuit 190. The illustrated buck converter circuit 190 includes a switch 107, which, in the example, is an N-channel MOSFET referenced to ground 110 and having a gate controlled by the controller 121 to operate at CRM. The buck converter circuit 190 may be an LED driver supplied by a DC voltage, VIN 101, of 48V, to drive an LED array 104, which may include LED devices or pixels connected in series and/or parallel. The illustrated LED array 104 has a forward voltage of 36V and a target current of 1 A. The capacitor 103 has a capacitance of 10 uF in parallel with the LED array load 104, the inductor 105 has an inductance of 22 uH, the resistor 102 has a resistance of 10 kOhm, the resistor 109 has a resistance of 10 kOhm, the resistor 112 has a resistance of 1.2 kOhm, and the capacitor 131 has a capacitance of 3 nF.

The resistors 109 and 112 form a resistor divider for ZCD during switching states, while the resistors 102, 109 and 112 largely define the LED array 104 voltage during non-switching states. Other circuit components may include a resistor 185 having a resistance of 10 kOhm, a zener diode 186 having a voltage rating of 10V, and a capacitor 187 having a capacitance of 100 nF. These circuit components may form the low voltage supply VCC of 10V to supply the comparator 114. A resistor divider formed from a resistor 189 having a resistance of 75 kOhm and a resistor 188 having a resistance of 25 kOhm may set the ZCD threshold voltage at the second input to the comparator 114 at 2.5V from VCC. The first input to the comparator 114 is the resistor 112 voltage at the ZCD node 136. Therefore, when the ZCD node voltage drops below the threshold of 2.5V, the comparator 114 may provide a high voltage output. When the MOSFET 107 is in the OFF state, the controller 121 may respond accordingly and switch the MOSFET 107 to the ON state.

To realize the target LED current of 1 A, the LED array 104 current may be sensed and fed back to the controller 121 to regulate the switching pattern at the gate of the MOSFET 107 through a closed control loop. When the 1 A current is regulated and achieved in such way, the steady state frequency may be described by Equation (2):

$$\text{Frequency} = V_{LED104}/V_{IN101} * (V_{IN101} - V_{LED104})/(L105 * 2 * I_{LED104}) \quad \text{Equation (2)},$$

with $V_{IN101}=48V$, $V_{LED104}=36V$, $L105=22$ uH, $I_{LED104}=1$ A.

Using the values specified with respect to the example of FIG. 1H, the calculated frequency in Equation (2) is about 204 kHz, corresponding to a cycle time of about 5 microseconds. To verify whether the start-up time interferes with the steady state operation, the maximum voltage at the node 108, VIN, may be assumed to calculate the minimum start-up time. The resistor 112 voltage may be described by Equation (3) below, where Tst stands for the start-up time:

$$V_{R112}=R112/(R109+R112)*\{V_{IN101}-V_{IN101}*[1-e^{-Tst/((R109+R112)*C131)}]\} \quad \text{Equation (3)},$$

with $V_{R112}=2.5V$, $R109=10$ k, $R112=1.2$ k, $C131=3$ nF, $V_{IN10}=48V$. Solving Equation (3) yields the start-up time of Tst being 24.2 microseconds, about 5 times the cycle time of 5 microseconds, which is a suitable design value.

Figure 1I:
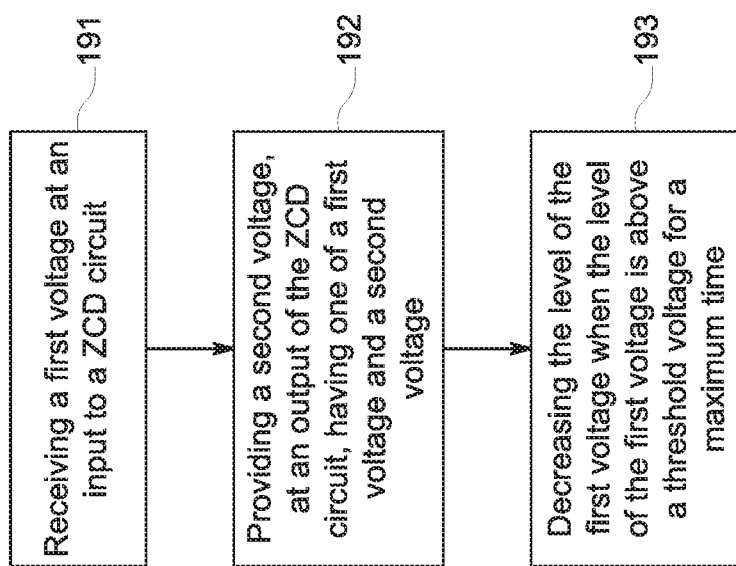
FIG. 1I is a flow diagram of an example method of operating a DC-DC converter circuit.

FIG. 1I is a flow diagram of an example method of operating a DC-DC converter circuit. In the example method, a first voltage is received at an input to the first circuit or ZCD circuit (191). A second voltage may be provided, at an output of the first circuit or ZCD circuit (192). The second voltage may have one of a first level and a second level (e.g., a high voltage and a low voltage). The level of the second voltage may be based on a level of the first voltage being above or below a threshold voltage. The level of the first voltage may be decreased by a second circuit or multi-functional circuit when the level of the first voltage is above the threshold voltage for a maximum time (193). In embodiments, the first circuit may be the ZCD circuit 123 of FIG. 1B and the second circuit may be the multi-functional circuit 132 of FIG. 1B.

In embodiments, a level of the first voltage may not be reduced below the threshold voltage on a condition that the level of the first voltage is above the threshold voltage for less than the maximum time. The second voltage may be applied to a switch, such as the switch 107 of FIG. 1B, to turn on the switch when the first voltage is below the threshold and turn off the switch when the first voltage is above the threshold. The current through an inductor may be increased from zero to a peak current, over a time period, responsive to turning the switch on. The current through the inductor may be decreased from the peak current to zero, over a time period, responsive to turning the switch off.

Figure 2:
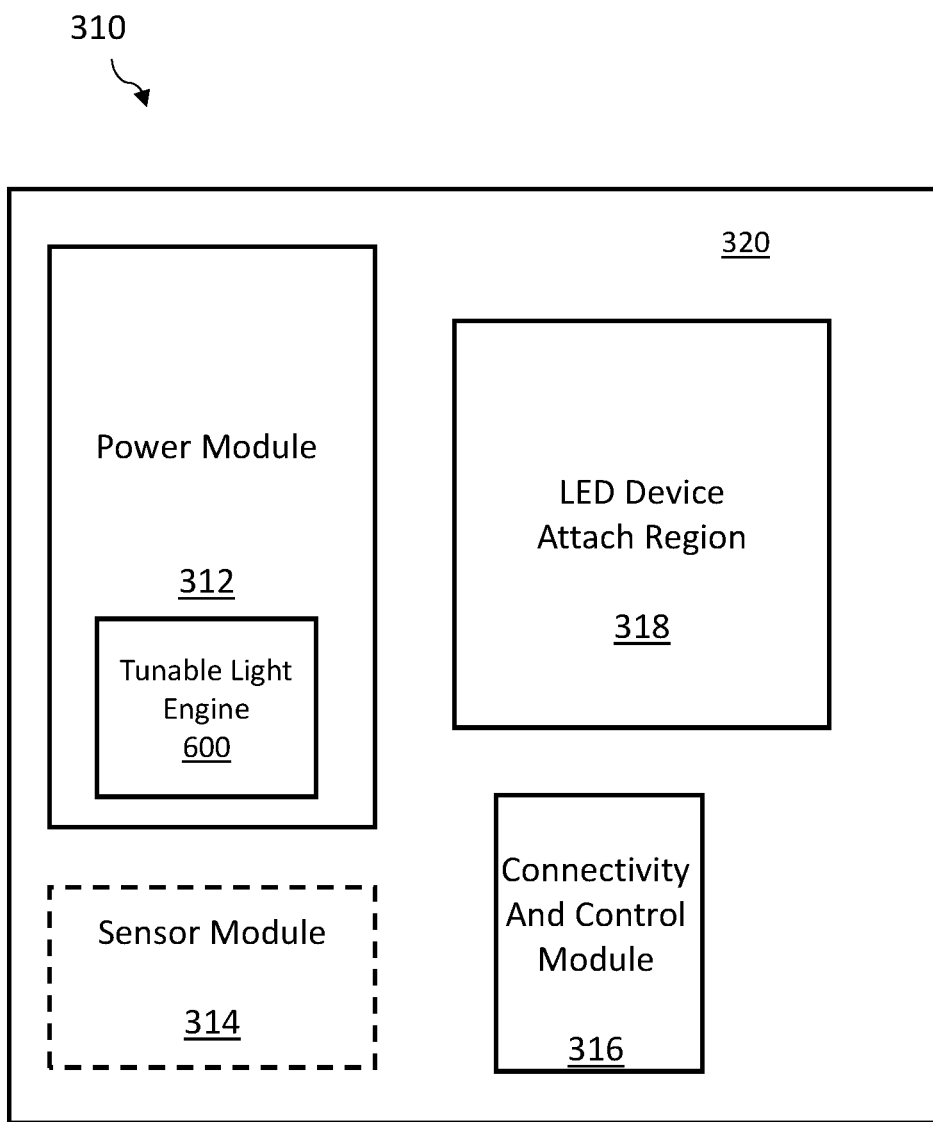
FIG. 2 is a top view of an electronics board for an integrated LED lighting system according to one embodiment.

FIG. 2 is a top view of an electronics board 310 for an integrated LED lighting system according to one embodiment. In the illustrated example, the electronics board 310 includes a power module 312, a sensor module 314, a connectivity and control module 316 and an LED attach region 318 reserved for attachment of an LED array to a substrate 320. In alternative embodiments, two or more electronics boards may be used for the LED lighting system. For example, the LED attach region 318 may be on a separate electronics board, or the sensor module 314 may be on a separate electronics board.

The substrate 320 may be any board capable of mechanically supporting, and providing electrical coupling to, electrical components, electronic components and/or electronic modules using conductive connecters, such as tracks, traces, pads, vias, and/or wires. The substrate 320 may include one or more metallization layers disposed between, or on, one or more layers of non-conductive material, such as a dielectric composite material. The power module 312 may include electrical and/or electronic elements. In an example embodiment, the power module 312 includes an AC/DC conversion circuit, a DC-DC conversion circuit, such as any of the DC-DC conversion circuits described herein, a dimming circuit, and an LED driver circuit.

The sensor module 314 may include sensors needed for an application in which the LED array is to be implemented. Example sensors may include optical sensors (e.g., IR sensors and image sensors), motion sensors, thermal sensors, mechanical sensors, proximity sensors, or even timers. By way of example, LEDs in street lighting, general illumination, and horticultural lighting applications may be turned off/on and/or adjusted based on a number of different sensor inputs, such as a detected presence of a user, detected ambient lighting conditions, detected weather conditions, or based on time of day/night. This may include, for example, adjusting the intensity of light output, the shape of light output, the color of light output, and/or turning the lights on or off to conserve energy. For AR/VR applications, motion sensors may be used to detect user movement. The motion sensors themselves may be LEDs, such as IR detector LEDs. By way of another example, for camera flash applications, image and/or other optical sensors or pixels may be used to measure lighting for a scene to be captured so that the flash lighting color, intensity illumination pattern, and/or shape may be optimally calibrated. In alternative embodiments, the electronics board 310 does not include a sensor module.

The connectivity and control module 316 may include the system microcontroller and any type of wired or wireless module configured to receive a control input from an external device. By way of example, a wireless module may include blue tooth, Zigbee, Z-wave, mesh, WiFi, near field communication (NFC) and/or peer to peer modules may be used. The microcontroller may be any type of special purpose computer or processor that may be embedded in an LED lighting system and configured or configurable to receive inputs from the wired or wireless module or other modules in the LED system (such as sensor data and data fed back from the LED module) and provide control signals to other modules based thereon. As mentioned above, the microcontroller may, in addition to performing other functions, provide control signals to switch the switch 107 between the ON and OFF states in response to a voltage received from the ZCD circuit 123. Algorithms implemented by the special purpose processor may be implemented in a computer program, software, or firmware incorporated in a non-transitory computer-readable storage medium for execution by the special purpose processor. Examples of non-transitory computer-readable storage mediums include a read only memory (ROM), a random access memory (RAM), a register, cache memory, and semiconductor memory devices. The memory may be included as part of the microcontroller or may be implemented elsewhere, either on or off the electronics board 310.

The term module, as used herein, may refer to electrical and/or electronic components disposed on individual circuit boards that may be soldered to one or more electronics boards 310. The term module may, however, also refer to electrical and/or electronic components that provide similar functionality, but which may be individually soldered to one or more circuit boards in a same region or in different regions.

Figure 3A:
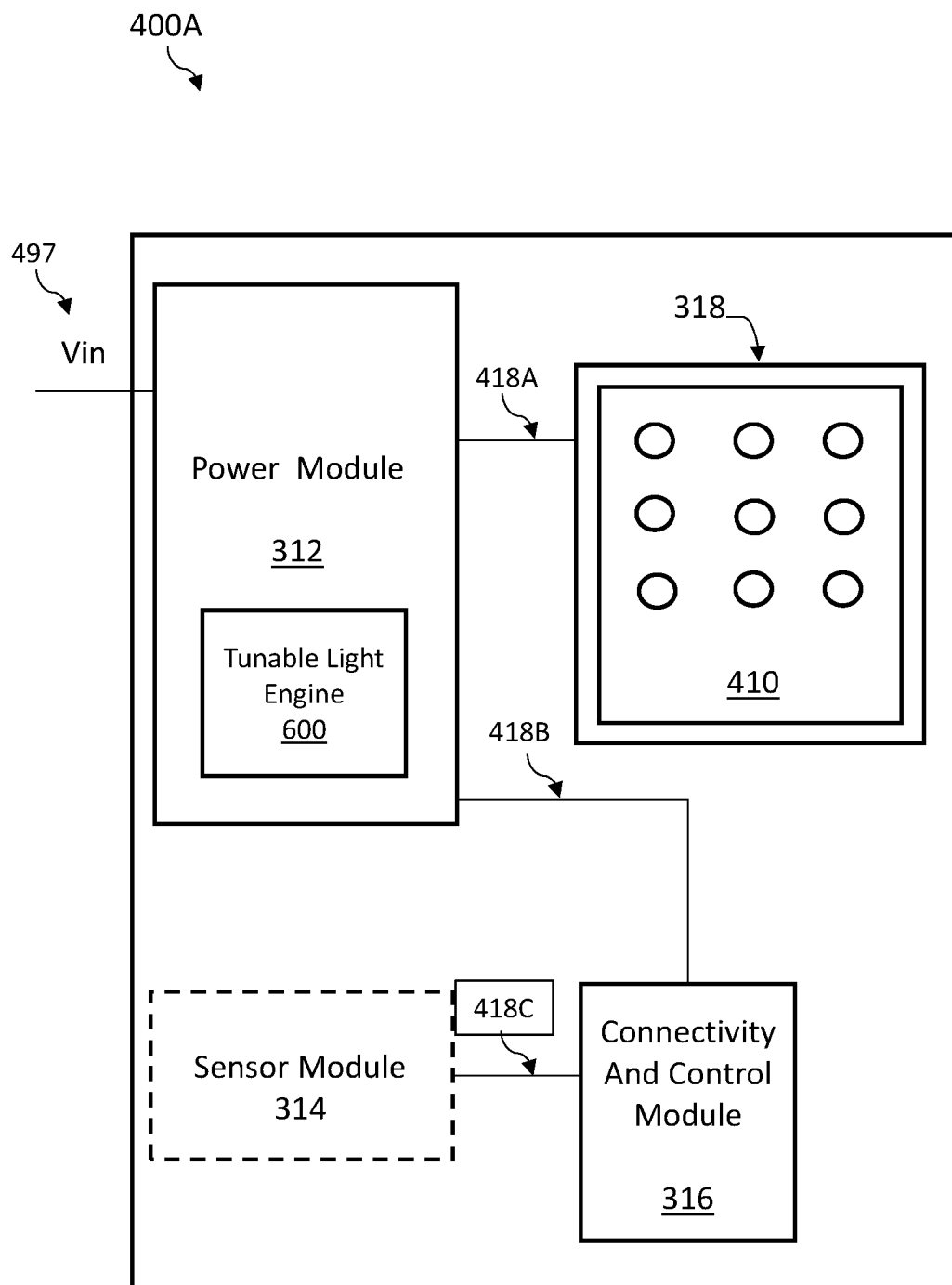
FIG. 3A is a top view of the electronics board with LED array attached to the substrate at the LED device attach region in one embodiment.

FIG. 3A is a top view of the electronics board 310 with an LED array 410 attached to the substrate 320 at the LED device attach region 318 in one embodiment. The electronics board 310 together with the LED array 410 represents an LED lighting system 400A. Additionally, the power module 312 receives a voltage input at Vin 497 and control signals from the connectivity and control module 316 over traces 418B, and provides drive signals to the LED array 410 over traces 418A. The LED array 410 is turned on and off via the drive signals from the power module 312. In the embodiment shown in FIG. 3A, the connectivity and control module 316 receives sensor signals from the sensor module 314 over traces 418.

Figure 3B:
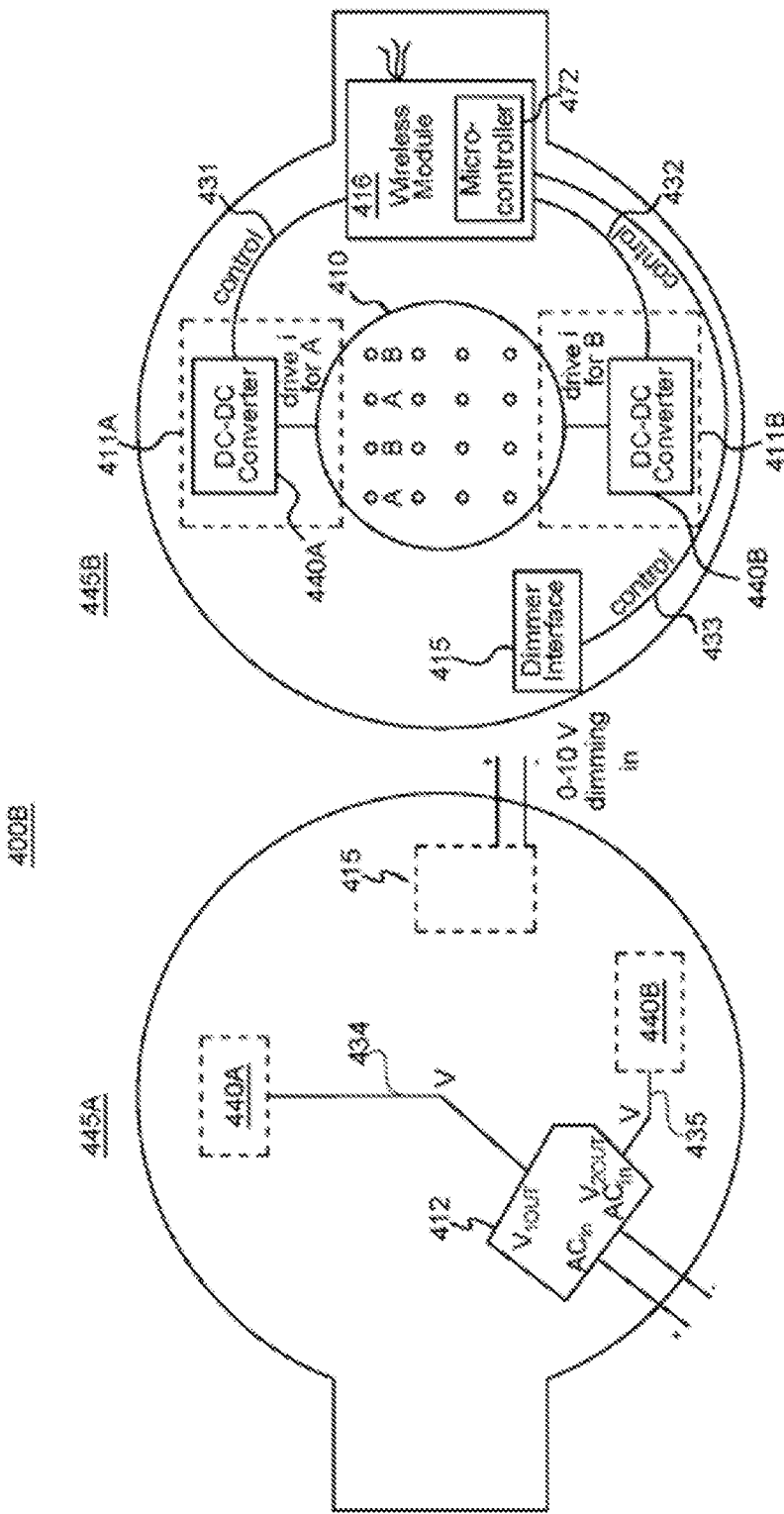
FIG. 3B is a diagram of one embodiment of a two channel integrated LED lighting system with electronic components mounted on two surfaces of a circuit board.

FIG. 3B illustrates one embodiment of a two channel integrated LED lighting system with electronic components mounted on two surfaces of a circuit board 499. As shown in FIG. 3B, an LED lighting system 400B includes a first surface 445A having inputs to receive dimmer signals and AC power signals and an AC/DC converter circuit 412 mounted on it. The LED system 400B includes a second surface 445B with the dimmer interface circuit 415, DC-DC converter circuits 440A and 440B, a connectivity and control module 416 (a wireless module in this example) having a microcontroller 472 (which may be the controller 121 of FIG. 1B), and an LED array 410 mounted on it. One or both of the DC-DC converter circuits 440A and 440B may be any of the DC-DC converter circuits described herein. The LED array 410 is driven by two independent channels 411A and 411B. In alternative embodiments, a single channel may be used to provide the drive signals to an LED array, or any number of multiple channels may be used to provide the drive signals to an LED array. For example, FIG. 3E illustrates an LED lighting system 400D having 3 channels and is described in further detail below.

The LED array 410 may include two groups of LED devices. In an example embodiment, the LED devices of group A are electrically coupled to a first channel 411A and the LED devices of group B are electrically coupled to a second channel 411B. Each of the two DC-DC converters 440A and 440B may provide a respective drive current via single channels 411A and 411B, respectively, for driving a respective group of LEDs A and B in the LED array 410. The LEDs in one of the groups of LEDs may be configured to emit light having a different color point than the LEDs in the second group of LEDs. Control of the composite color point of light emitted by the LED array 410 may be tuned within a range by controlling the current and/or duty cycle applied by the individual DC-DC converter circuits 440A and 440B via a single channel 411A and 411B, respectively. Although the embodiment shown in FIG. 3B does not include a sensor module (as described in FIG. 2 and FIG. 3A), an alternative embodiment may include a sensor module.

The illustrated LED lighting system 400B is an integrated system in which the LED array 410 and the circuitry for operating the LED array 410 are provided on a single electronics board. Connections between modules on the same surface of the circuit board 499 may be electrically coupled for exchanging, for example, voltages, currents, and control signals between modules, by surface or sub-surface interconnections, such as traces 431, 432, 433, 434 and 435 or metallizations (not shown). Connections between modules on opposite surfaces of the circuit board 499 may be electrically coupled by through board interconnections, such as vias and metallizations (not shown).

Figure 3C:
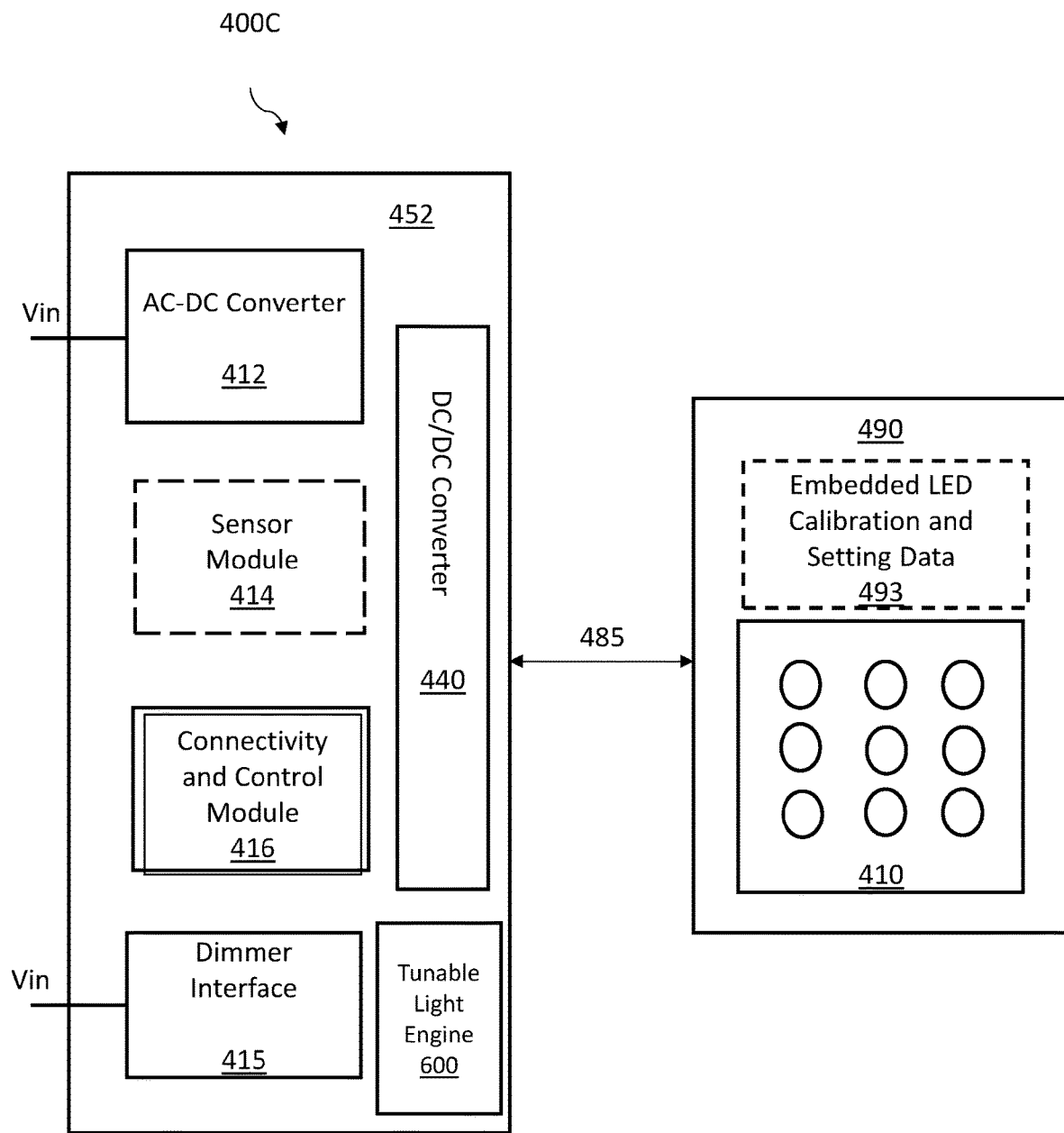
FIG. 3C is a diagram of an embodiment of an LED lighting system where the LED array is on a separate electronics board from the driver and control circuitry.

FIG. 3C illustrates an embodiment of an LED lighting system where the LED array is on a separate electronics board from the driver and control circuitry. The LED lighting system 400C includes a power module 452 that is on a separate electronics board than an LED module 490. The power module 452 may include, on a first electronics board, an AC/DC converter circuit 412, a sensor module 414, a connectivity and control module 416, a dimmer interface circuit 415 and a DC-DC converter 440, which may be any of the DC-DC converter circuits described herein. The LED module 490 may include, on a second electronics board, embedded LED calibration and setting data 493 and the LED array 410. Data, control signals and/or LED driver input signals 485 may be exchanged between the power module 452 and the LED module 490 via wires that may electrically and communicatively couple the two modules. The embedded LED calibration and setting data 493 may include any data needed by other modules within a given LED lighting system to control how the LEDs in the LED array are driven. In one embodiment, the embedded calibration and setting data 493 may include data needed by the microcontroller to generate or modify a control signal that instructs the driver to provide power to each group of LEDs A and B using, for example, pulse width modulated (PWM) signals. In this example, the calibration and setting data 493 may inform a microcontroller of the connectivity and control module 416 as to, for example, the number of power channels to be used, a desired color point of the composite light to be provided by the entire LED array 410, and/or a percentage of the power provided by the AC/DC converter circuit 412 to provide to each channel.

Figure 3D:
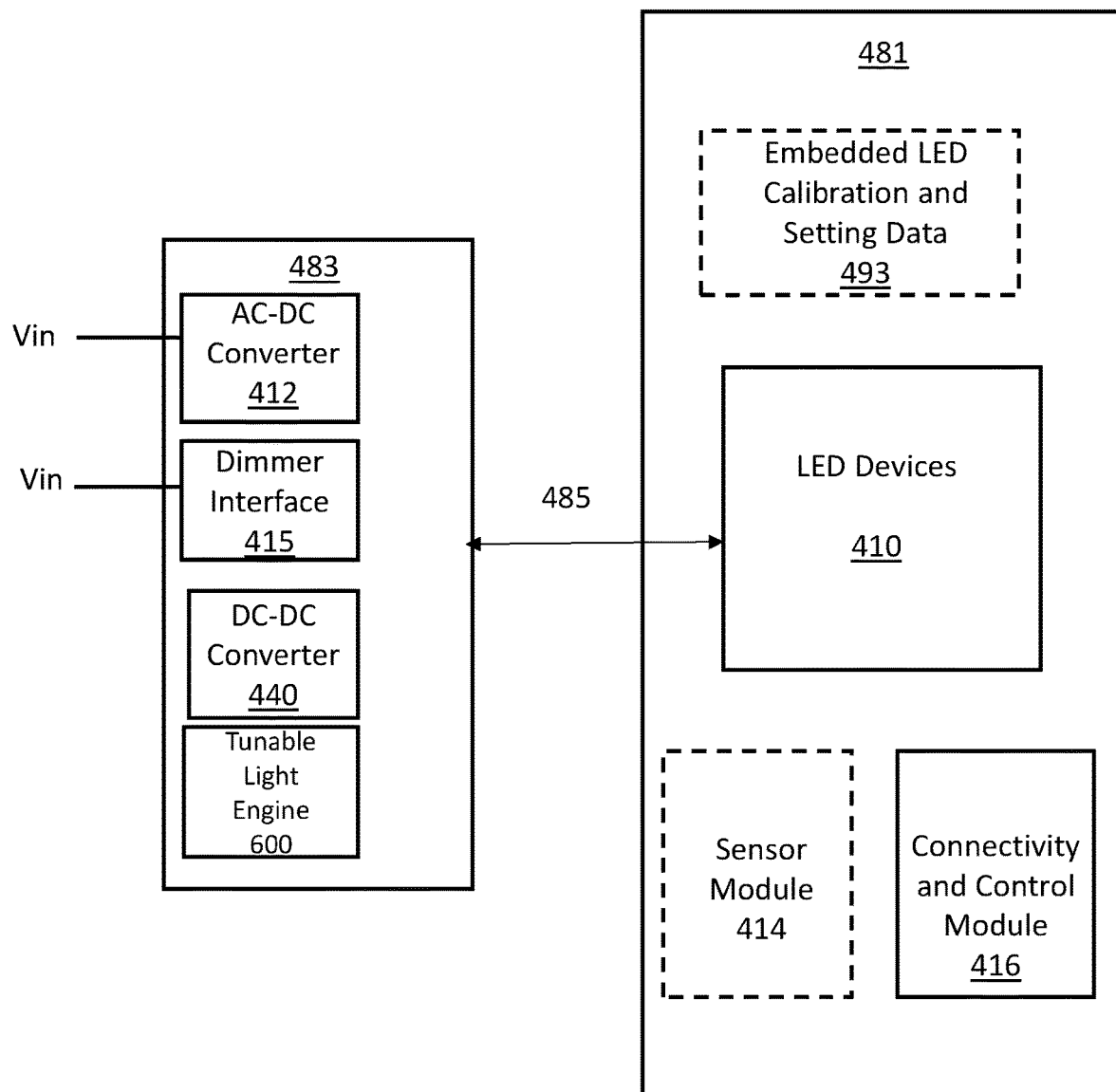
FIG. 3D is a block diagram of an LED lighting system having the LED array together with some of the electronics on an electronics board separate from the driver circuit.
Figure 3E:
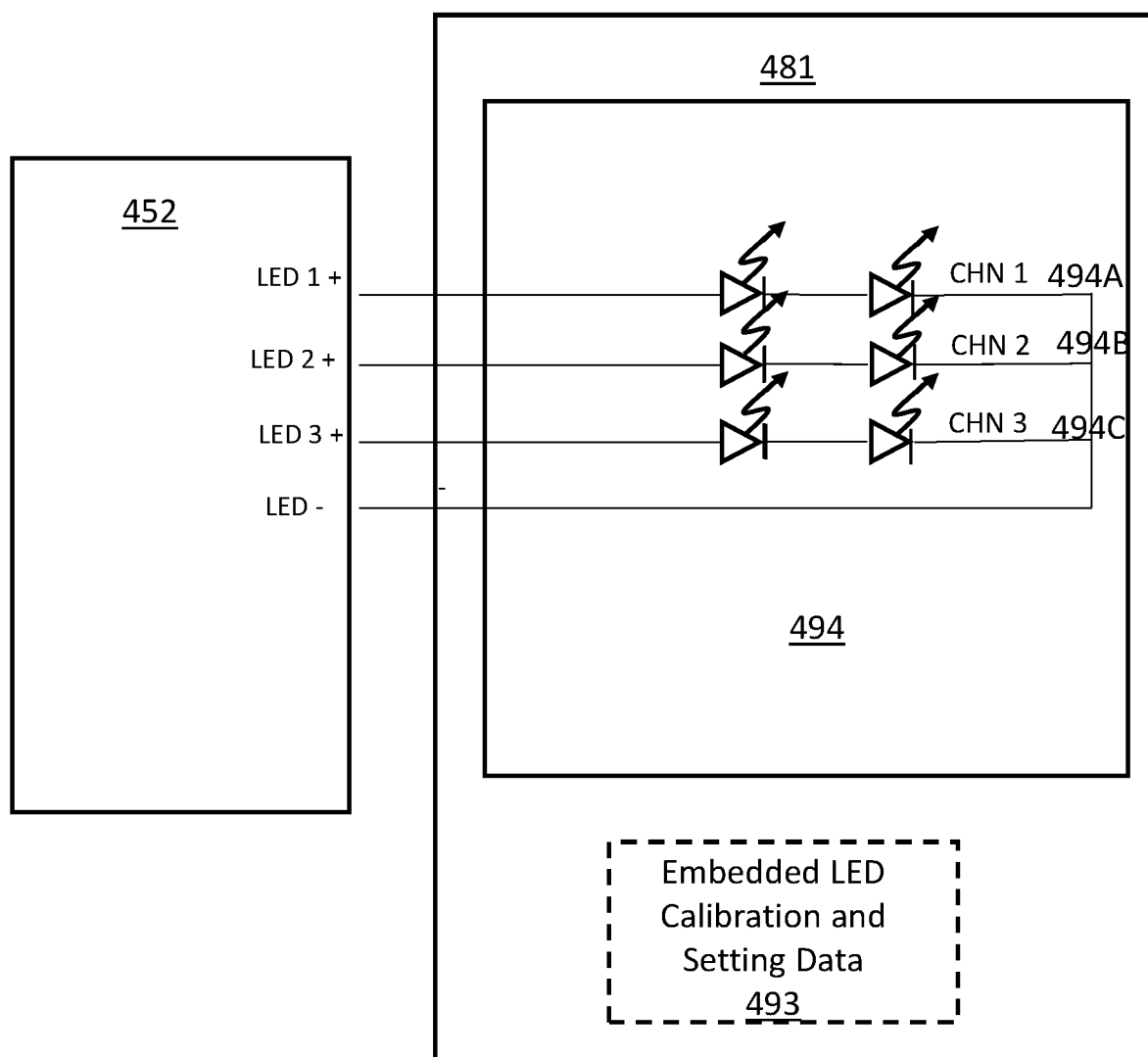
FIG. 3E is a diagram of example LED lighting system showing a multi-channel LED driver circuit.

FIG. 3D illustrates a block diagram of an LED lighting system having the LED array together with some of the electronics on an electronics board separate from the driver circuit. An LED system 400D includes a power conversion module 483 and an LED module 493 located on a separate electronics board. The power conversion module 483 may include the AC/DC converter circuit 412, the dimmer interface circuit 415 and the DC-DC converter circuit 440, which may be any of the DC-DC converter circuits described herein, and the LED module 493 may include the embedded LED calibration and setting data 493, LED array 410, sensor module 414 and connectivity and control module 416. The power conversion module 483 may provide LED driver input signals 485 to the LED array 410 via a wired connection between the two electronics boards.

FIG. 3E is a diagram of an example LED lighting system 400E showing a multi-channel LED driver circuit. In the illustrated example, the system 400E includes a power module 452 and an LED module 491 that includes the embedded LED calibration and setting data 493 and three groups of LEDs 494A, 494B and 494C. While three groups of LEDs are shown in FIG. 3E, one of ordinary skill in the art will recognize that any number of groups of LEDs may be used consistent with the embodiments described herein. Further, while the individual LEDs within each group are arranged in series, they may be arranged in parallel in some embodiments.

The LED array 491 may include groups of LEDs 494 that provide light having different color points. For example, the LED array 491 may include a warm white light source via a first group of LEDs 494A, a cool white light source via a second group of LEDs 494B and a neutral while light source via a third group of LEDs 494C. The warm white light source via the first group of LEDs 494A may include one or more LEDs that are configured to provide white light having a correlated color temperature (CCT) of approximately 2700K. The cool white light source via the second group of LEDs 494B may include one or more LEDs that are configured to provide white light having a CCT of approximately 6500K. The neutral white light source via the third group of LEDs 494C may include one or more LEDs configured to provide light having a CCT of approximately 4000K. While various white colored LEDs are described in this example, one of ordinary skill in the art will recognize that other color combinations are possible consistent with the embodiments described herein to provide a composite light output from the LED array 491 that has various overall colors.

The power module 452 may include a tunable light engine (not shown), which may be configured to supply power to the LED array 491 over three separate channels (indicated as LED1+, LED2+ and LED3+ in FIG. 3E). More particularly, the tunable light engine may be configured to supply a first PWM signal to the first group of LEDs 494A such as warm white light source via a first channel, a second PWM signal to the second group of LEDs 494B via a second channel, and a third PWM signal to the third group of LEDs 494C via a third channel. Each signal provided via a respective channel may be used to power the corresponding LED or group of LEDs, and the duty cycle of the signal may determine the overall duration of on and off states of each respective LED. The duration of the on and off states may result in an overall light effect which may have light properties (e.g., correlated color temperature (CCT), color point or brightness) based on the duration. In operation, the tunable light engine may change the relative magnitude of the duty cycles of the first, second and third signals to adjust the respective light properties of each of the groups of LEDs to provide a composite light with the desired emission from the LED array 491. As noted above, the light output of the LED array 491 may have a color point that is based on the combination (e.g., mix) of the light emissions from each of the groups of LEDs 494A, 494B and 494C.

In operation, the power module 452 may receive a control input generated based on user and/or sensor input and provide signals via the individual channels to control the composite color of light output by the LED array 491 based on the control input. In some embodiments, a user may provide input to the LED system for control of the DC-DC converter circuit, such as any of the DC-DC converter circuits described herein, by turning a knob or moving a slider that may be part of, for example, a sensor module (not shown). Additionally or alternatively, in some embodiments, a user may provide input to the LED lighting system 400D using a smartphone and/or other electronic device to transmit an indication of a desired color to a wireless module (not shown).

Figure 4:
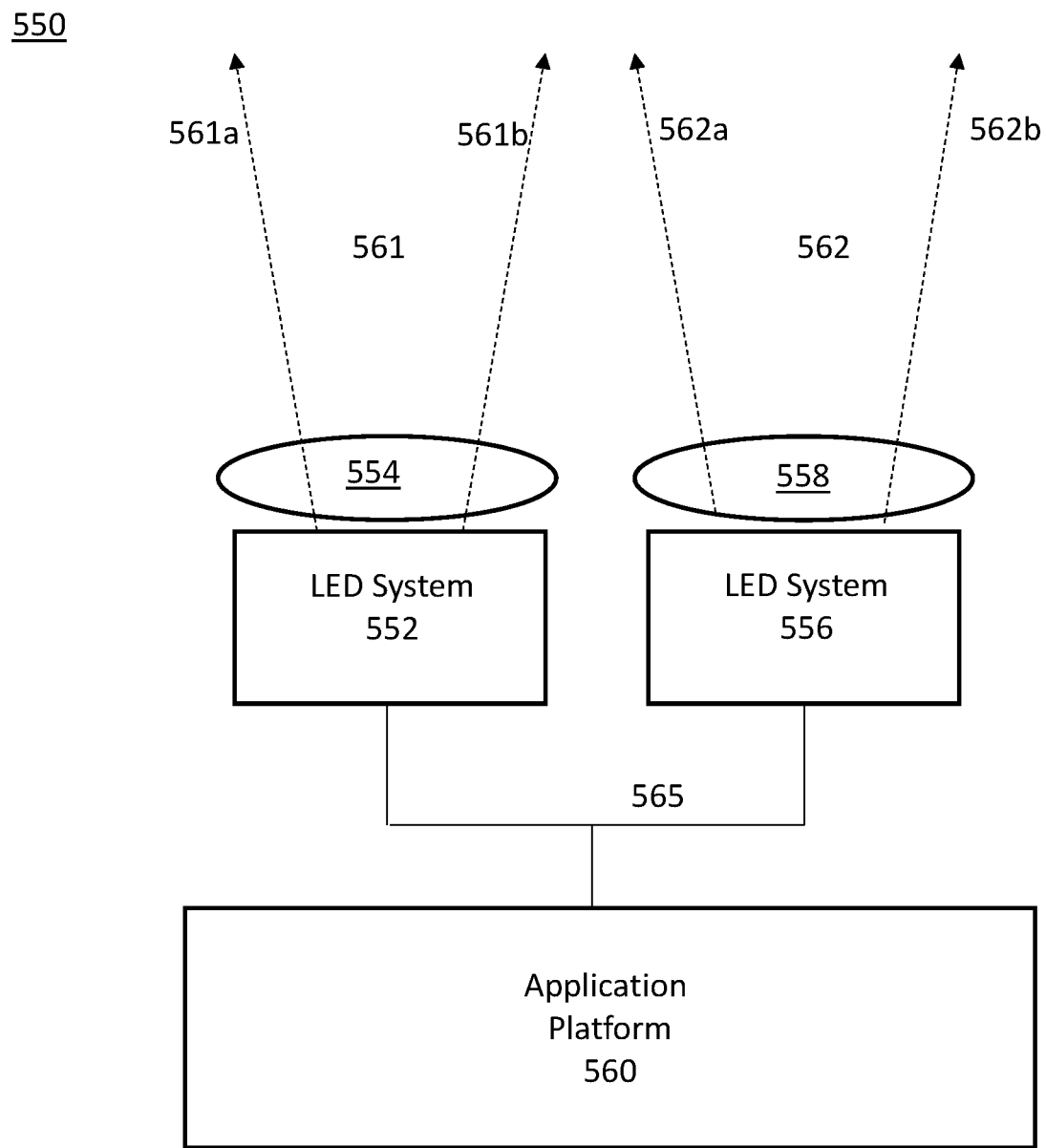
FIG. 4 is a diagram of an example application system.

FIG. 4 shows an example system 550 which includes an application platform 560, LED lighting systems 552 and 556, and secondary optics 554 and 558. The LED lighting system 552 produces light beams 561 shown between arrows 561*a* and 561*b*. The LED lighting system 556 may produce light beams 562 between arrows 562*a* and 562*b*. In the embodiment shown in FIG. 4, the light emitted from LED lighting system 552 passes through secondary optics 554, and the light emitted from the LED lighting system 556 passes through secondary optics 558. In alternative embodiments, the light beams 561 and 562 do not pass through any secondary optics. The secondary optics 554, 558 may be, or may include, one or more light guides. The one or more light guides may be edge lit or may have an interior opening that defines an interior edge of the light guide. LED lighting systems 552 and/or 556 may be inserted in the interior openings of the one or more light guides such that they inject light into the interior edge (interior opening light guide) or exterior edge (edge lit light guide) of the one or more light guides. LEDs in LED lighting systems 552 and/or 556 may be arranged around the circumference of a base that is part of the light guide. According to an implementation, the base may be thermally conductive. According to an implementation, the base may be coupled to a heat-dissipating element that is disposed over the light guide. The heat-dissipating element may be arranged to receive heat generated by the LEDs via the thermally conductive base and dissipate the received heat. The one or more light guides may allow light emitted by LED lighting systems 552 and 556 to be shaped in a desired manner such as, for example, with a gradient, a chamfered distribution, a narrow distribution, a wide distribution, an angular distribution, or the like.

In example embodiments, the system 550 may be a mobile phone of a camera flash system, indoor residential or commercial lighting, outdoor light such as street lighting, an automobile, a medical device, AR/VR devices, and robotic devices. The integrated LED lighting system 400A shown in FIG. 3A, the integrated LED lighting system 400B shown in FIG. 3B, the LED lighting system 400C shown in FIG. 3C, and the LED lighting system 400D shown in FIG. 3D illustrate LED lighting systems 552 and 556 in example embodiments.

In example embodiments, the system 550 may be a mobile phone of a camera flash system, indoor residential or commercial lighting, outdoor light such as street lighting, an automobile, a medical device, AR/VR devices, and robotic devices. The integrated LED lighting system 400A shown in FIG. 3A, the integrated LED lighting system 400B shown in FIG. 3B, the LED lighting system 400C shown in FIG. 3C, and the LED lighting system 400D shown in FIG. 3D illustrate LED lighting systems 552 and 556 in example embodiments.

The application platform 560 may provide power to the LED lighting systems 552 and/or 556 via a power bus via line 565 or other applicable input, as discussed herein. Further, application platform 560 may provide input signals via line 565 for the operation of the LED lighting system 552 and LED lighting system 556, which input may be based on a user input/preference, a sensed reading, a pre-programmed or autonomously determined output, or the like. One or more sensors may be internal or external to the housing of the application platform 560.

In various embodiments, application platform 560 sensors and/or LED lighting system 552 and/or 556 sensors may collect data such as visual data (e.g., LIDAR data, IR data, data collected via a camera, etc.), audio data, distance based data, movement data, environmental data, or the like or a combination thereof. The data may be related a physical item or entity such as an object, an individual, a vehicle, etc. For example, sensing equipment may collect object proximity data for an ADAS/AV based application, which may prioritize the detection and subsequent action based on the detection of a physical item or entity. The data may be collected based on emitting an optical signal by, for example, LED lighting system 552 and/or 556, such as an IR signal and collecting data based on the emitted optical signal. The data may be collected by a different component than the component that emits the optical signal for the data collection. Continuing the example, sensing equipment may be located on an automobile and may emit a beam using a vertical-cavity surface-emitting laser (VCSEL). The one or more sensors may sense a response to the emitted beam or any other applicable input.

In example embodiment, application platform 560 may be an automobile and LED lighting system 552 and LED lighting system 556 may be automobile headlights. In various embodiments, the system 550 may represent an automobile with steerable light beams where LEDs may be selectively activated to provide steerable light. For example, an array of LEDs may be used to define or project a shape or pattern or illuminate only selected sections of a roadway. In an example embodiment, Infrared cameras or detector pixels within LED lighting systems 552 and/or 556 may be sensors that identify portions of a scene (roadway, pedestrian crossing, etc.) that require illumination.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A device comprising:
   a switch;
   a controller electrically coupled to the switch and configured to provide a control signal to control the switch to charge and discharge an inductor through a first capacitive element between a zero current state and a peak current state to provide a light emitting diode (LED) drive current;
   an RC circuit comprising at least a first resistive element, a second resistive element, and a second capacitive element;
   a diode electrically coupled in parallel with the RC circuit; and
   a zero current detection circuit having a first input electrically coupled to the RC circuit, a second input electrically coupled to a threshold voltage, and an output electrically coupled to the controller.

2. The device of claim 1, wherein the zero current detection circuit comprises a comparator that includes the first input, the second input, and the output.

3. The device of claim 1, further comprising circuitry electrically coupled to the second input and configured to supply the threshold voltage at the second input.

4. The device of claim 1, wherein a level of the threshold voltage is based at least in part on a voltage level at the first input that indicates the zero current state of the inductor.

5. The device of claim 1, wherein the switch is electrically coupled in parallel to the zero current detection circuit.

6. The device of claim 1, wherein the first resistive element and the second resistive element are electrically coupled in series with the capacitive element.

7. The device of claim 1, wherein the first resistive element, the second resistive element, and the capacitive have values such that a time constant of the RC circuit is longer than a maximum time for the power stage circuit to remain in a state other than the zero current state.

8. The device of claim 1, wherein the device is a direct current (DC)-DC power converter circuit, and the controller is configured to operate the DC-DC power converter circuit in a critical mode (CRM).

9. The device of claim 1, further comprising a power stage circuit comprising the inductor.

10. The device of claim 1, wherein the first input of the zero current detection circuit is electrically coupled to a node between the first resistive element and the second resistive element.

11. The device of claim 1, wherein the zero current detection circuit is configured to provide a voltage to the controller having one of a first level and a second level based on a voltage level at the first input being above or below the threshold voltage.

12. A system comprising:
    a light emitting diode (LED) device array; and
    at least one DC-DC converter circuit, the at least one DC-DC converter circuit comprising:
    a power converter power stage circuit electrically coupled to receive a direct current (DC) voltage and supply a current to the LED array, a first circuit configured to receive a first voltage, at a first input, and provide a second voltage having one of a first level and a second level based on a level of the first voltage being above or below a threshold voltage, and a second circuit electrically coupled to the first input of the first circuit and configured to decrease the level of the first voltage below the threshold voltage when the first voltage is at a level that represents a non-zero current detection state of the power converter power stage circuit for a maximum time.

13. The system of claim 12, wherein the first circuit comprises a comparator that includes the first input and a second input.

14. The system of claim 13, further comprising circuitry electrically coupled to the second input of the comparator and configured to supply the threshold voltage at the second input.

15. The system of claim 12, further comprising a switch in the power converter power stage circuit electrically coupled in parallel to the second circuit.

16. The system of claim 12, wherein the second circuit comprises a resistor-capacitor (RC) circuit comprising: a first resistor and a second resistor coupled in series with a capacitor, and a diode coupled in parallel with the first resistor and the second resistor, the first input to the first circuit being coupled at a node between the first resistor and the second resistor.

17. The system of claim 16, wherein the first resistor, the second resistor, and the capacitor have values such that a time constant of the RC circuit is longer than the maximum time by an amount.

18. The system of claim 12, further comprising:
an alternating current (AC) to DC converter circuit;
a wired or wireless receiver; and
a microcontroller configured to receive at least one of a voltage from the first circuit and one or more inputs from the at least one of the wired or wireless receiver and control a switch in the DC-DC converter circuit based on at least one of the voltage and the one or more inputs.

19. A method comprising:
receiving a first voltage at an input to a zero current detection circuit, the first voltage indicating at least that a power converter circuit is in one of a zero current state and a peak current state;
providing a second voltage, at an output of the zero current detection circuit, having one of a first level and a second level based on a level of the first voltage being above or below a threshold voltage; and
decreasing the level of the first voltage below the threshold voltage when the level of the first voltage is above the threshold voltage for a maximum time.

20. The method of claim 19, further comprising not decreasing the level of the first voltage below the threshold when the level of the first voltage is above the threshold for less than the maximum time.

21. The method of claim 20, further comprising operating the power converter circuit between a zero current state and a peak current state in a critical mode, the operating the power converter circuit in the critical mode comprising:
increasing a current at an inductor of the power converter circuit from zero current to a peak current, over a first time period, and
decreasing the current at the inductor from the peak current to the zero current, over a second time period.

22. The method of claim 19, further comprising applying the second voltage to a switch to turn on the switch when the first voltage is below the threshold voltage and turn off the switch when the first voltage is above the threshold voltage.

* * * * *